US010783112B2

(12) United States Patent
Belknap et al.

(10) Patent No.: US 10,783,112 B2
(45) Date of Patent: Sep. 22, 2020

(54) HIGH PERFORMANCE COMPLIANCE MECHANISM FOR STRUCTURED AND UNSTRUCTURED OBJECTS IN AN ENTERPRISE

(71) Applicant: International Business Machines Corporation, Armonk, NY (US)

(72) Inventors: William R. Belknap, San Jose, CA (US); Rajesh M. Desai, San Jose, CA (US); Roger C. Raphael, San Jose, CA (US); Ronald L. Rathgeber, Tustin, CA (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/470,194

(22) Filed: Mar. 27, 2017

(65) Prior Publication Data

US 2018/0276222 A1    Sep. 27, 2018

(51) Int. Cl.
*G06F 16/11* (2019.01)
*G06F 16/21* (2019.01)
*G06F 16/20* (2019.01)
*G06F 16/907* (2019.01)
*G06F 16/16* (2019.01)
*G06Q 10/10* (2012.01)
*G06F 16/30* (2019.01)

(52) U.S. Cl.
CPC .......... *G06F 16/122* (2019.01); *G06F 16/162* (2019.01); *G06F 16/21* (2019.01); *G06F 16/30* (2019.01); *G06F 16/907* (2019.01); *G06Q 10/10* (2013.01); *G06F 16/20* (2019.01)

(58) Field of Classification Search
CPC .......... G06F 17/30082; G06F 17/3061; G06F 17/30117; G06F 17/30289; G06F 17/30286; G06F 16/11; G06F 16/907; G06F 16/16; G06F 16/30; G06F 16/21; G06F 16/20; G06Q 10/10
See application file for complete search history.

(56) References Cited

U.S. PATENT DOCUMENTS 8,290,916 B2 * 10/2012 Vu ..................... G06F 17/30705
707/694
8,386,533 B2    2/2013 Venkata
(Continued)

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
(Continued)

*Primary Examiner* — Tarek Chbouki
*Assistant Examiner* — Maher N Algibhah
(74) *Attorney, Agent, or Firm* — Konrad Raynes Davda & Victor LLP; Janaki K. Davda

(57) ABSTRACT

Provided are techniques for a high performance compliance mechanism for structured and unstructured data in an enterprise. A record to represent a collection of structured objects is generated. The record is stored in a file plan container associated with a disposition schedule. The collection of the structured objects represented by the record is disposed in accordance with the disposition schedule.

18 Claims, 10 Drawing Sheets

(56) References Cited

U.S. PATENT DOCUMENTS

| | | | |
|---|---|---|---|
| 8,438,146 B2* | 5/2013 | Costecalde | H04L 67/02 707/705 |
| 2006/0230044 A1* | 10/2006 | Utiger | G06F 17/30345 |
| 2007/0088585 A1* | 4/2007 | Maguire | G06Q 10/06 705/301 |
| 2007/0088736 A1* | 4/2007 | DeBie | G06Q 10/10 |
| 2007/0283417 A1* | 12/2007 | Smolen | G06F 17/30348 726/2 |
| 2007/0294308 A1 | 12/2007 | Megerian | |
| 2008/0154956 A1* | 6/2008 | DeBie | G06Q 10/10 |
| 2009/0150866 A1* | 6/2009 | Schmidt | G06Q 90/00 717/120 |
| 2009/0327375 A1* | 12/2009 | Paknad | G06F 16/125 |
| 2012/0191711 A1 | 7/2012 | Ayars et al. | |
| 2014/0019426 A1 | 1/2014 | Palmer | |
| 2014/0136575 A1* | 5/2014 | Zhao | G06F 16/215 707/813 |
| 2014/0165030 A1* | 6/2014 | Chevallier-Mames | G06F 21/14 717/110 |
| 2014/0379670 A1 | 12/2014 | Kuhr | |
| 2016/0078076 A1* | 3/2016 | Dineros | G06F 17/3012 707/609 |
| 2016/0110370 A1 | 4/2016 | Wetherall et al. | |
| 2016/0110374 A1* | 4/2016 | Wetherall | G06F 17/30011 707/825 |
| 2018/0253440 A1* | 9/2018 | Levesque | G06F 16/168 |
| 2018/0276223 A1* | 9/2018 | Dhanasekaran | G06F 16/1844 |

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.

* cited by examiner

HIGH PERFORMANCE COMPLIANCE MECHANISM FOR STRUCTURED AND UNSTRUCTURED OBJECTS IN AN ENTERPRISE

FIELD

Embodiments of the invention relate to a high performance compliance mechanism for structured and unstructured objects in an enterprise.

BACKGROUND

Compliance is focused on insuring that documents are retained per applicable law, statute, and corporate standards. Similarly, compliance insures that documents are destroyed when no longer needed per law, statute, or corporate standards. Compliance systems also support placing objects on legal hold to retain objects past their minimum retention period when they are related to a legal procedure, such as a lawsuit or audit.

Records management is a subset of compliance and is an information governance process that includes capturing records, applying record policies, protecting content on litigation hold, and automatically disposing of content beyond a retention period and not on legal hold, based on documented and approved legally defensible processes. A documented and approved legally defensible process that is scrupulously followed, and with proper safeguards, goes a long way with the courts to show good faith intent to manage content and protect that content (e.g., subject to anticipated litigation).

The primary focus of existing compliance systems, including records management systems, has been on unstructured data and physical objects. The unstructured data includes various documents that are created during the normal processes of an enterprise, while physical objects are typically paper based documents that are also managed as records. Compliance and records management processes include the process of determining which of these objects are governed by compliance rules or qualify as records, and managing the life-cycle of these objects from creation through eventual disposition. The life-cycle is based on corporate policy or on laws and regulations that apply to the data. The compliance and records management process insures that these objects are retained for the period of time required by law or policy, and then insures that the objects are destroyed when the specified period has elapsed.

Herein, these processes are referred to as compliance, which will encompass both normal compliance, as well as, the more stringent records management processes. As stated above, records management is a subset of compliance that is focused on key corporate information that meets the definition of a corporate record that must follow the more stringent records management policies.

Structured data typically comprise enterprise transactional systems, such as databases. The databases may be Structured Query Language (SQL) systems or non-SQL systems. These tend to be systems involving very high transactional rates. Given the dynamic nature of structured data (structured objects), the impact on managing singleton transactions (no matter what relational schema is used) leads to the object explosion problem in the records management metadata system, if the structured data is managed at the individual transaction basis.

Current systems do not extend compliance processes and principals to structured data. Instead, structured data is typically managed through a simple retention process in which older data is typically archived and then eventually deleted. This archiving and then deletion process can lead to structured data either being deleted too soon or retained indefinitely to ensure that applicable laws, regulations, and corporate policies are met. Additionally, structured data is typically aggregated into large archives that contain a variety of data representing a spectrum of information that would likely have different disposition schedules if properly treated as records. Since the structured data is aggregated, the structured data cannot be disposed of per the proper disposition schedules since they are likely mixed in with information that would possibly have different disposition schedules. Instead, the aggregation is treated as a whole and only deleted after all of the information in the aggregation has surpassed their required disposition date, or possibly never deleted at all.

SUMMARY

Provided is a method for a high performance compliance mechanism for structured and unstructured objects in an enterprise. The method comprises: generating, using a processor of a computer, a record to represent a collection of structured objects; storing the record in a file plan container associated with a disposition schedule; and disposing the collection of the structured objects represented by the record in accordance with the disposition schedule.

Provided is a computer program product for a high performance compliance mechanism for structured and unstructured objects in an enterprise. The computer program product comprising a computer readable storage medium having program code embodied therewith, the program code executable by at least one processor to perform: generating a record to represent a collection of structured objects; storing the record in a file plan container associated with a disposition schedule; and disposing the collection of the structured objects represented by the record in accordance with the disposition schedule.

Provided is a computer system for a high performance compliance mechanism for structured and unstructured objects in an enterprise. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: generating a record to represent a collection of structured objects; storing the record in a file plan container associated with a disposition schedule; and disposing the collection of the structured objects represented by the record in accordance with the disposition schedule.

With embodiments, the collection of the structured objects comprises structured objects having a disposition date within a particular range. This advantageously allows for selection using a range.

With embodiments, the file plan container includes a record to represent an unstructured object. This advantageously allows the record for the unstructured object to be stored with the record for the collection of structured objects.

With embodiments, the record representing the unstructured object is disposed in accordance with the disposition schedule. This advantageously allows the record for the unstructured object to be disposed of with the record for the collection of structured objects.

With embodiments, the record representing the collection of the structured objects and the record representing the unstructured object are held based on a hold criteria. This advantageously allows both the record for the collection of the structured objects and the record for the unstructured object to be held together.

With embodiments, a hold archive dataset is created for the collection of the structured objects with one of a split copy operation and a hard split operation.

A Software as a Service (SaaS) is configured to perform operations of embodiments.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
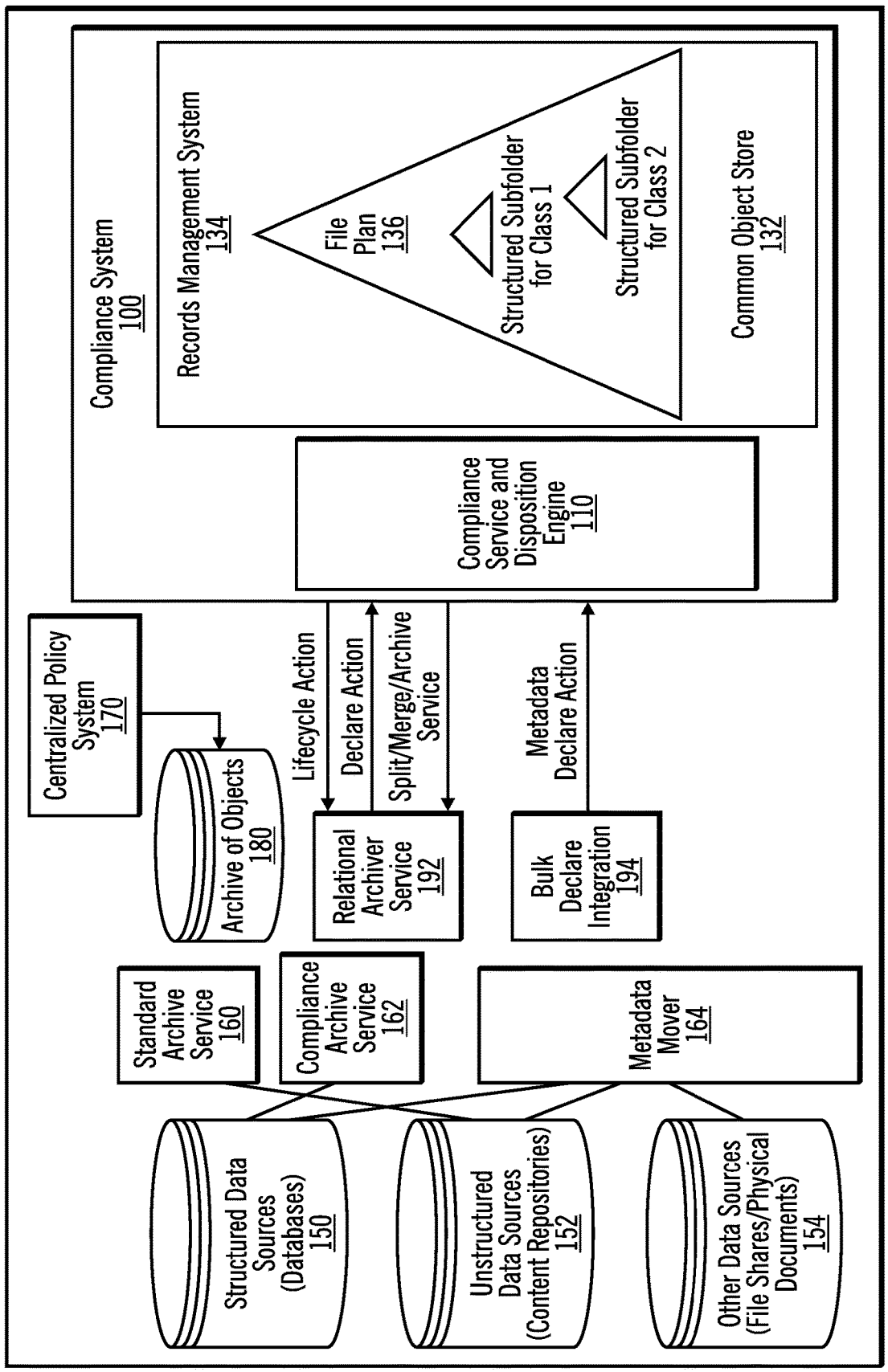
FIG. 1 illustrates, in a block diagram, a computing environment in accordance with certain embodiments.

FIG. 1 illustrates, in a block diagram, a computing environment in accordance with certain embodiments. In FIG. 1, a compliance system 100 includes compliance service and disposition engine 110 and a common object store 132. A records management system 134 file plan 136 sits on top of the common object store 132. The records management system 134, stores a file plan 131, which may also be referred to as a "unified records file plan with records policies". The file plan 136 includes records policies (e.g., disposition schedules) for retention, disposition, and other processing of records stored in the file plan 136. Objects in the common object store 132 are stored in file plan containers (e.g., folders and sub-folders) of the file plan 136. Examples of file plan containers include structured subfolder for class 1 and structured subfolder for class 2, where different classes of objects may be stored in these different subfolders.

On the left hand side of FIG. 1 are various data sources: structured data sources (databases) 150, unstructured data sources (content repositories) 152, and other data sources (such as file shares, physical documents, etc.) 154. In typical systems, the unstructured data sources 152 and other data sources 154 are covered for compliance. Embodiments expand compliance to include the objects in the structured data sources 150.

The standard archive service 160 processes unstructured data (from unstructured data sources 152). With embodiments, the compliance archive service 162 has a simple rule based mechanism that archives objects in the structured data sources 150 (while leaving these objects in the structured data sources 150). With embodiments, the standard archive service 160 later deletes large chunks of structured data (from the structured data sources 150) as a whole when no longer needed for compliance. The metadata mover 164 is the mechanism to gather information on the objects in each of the data sources 150, 152, 154 and move this information to the compliance system 100. Moving just the metadata and not the associated objects (content) allows the compliance service and disposition engine 110 of the compliance system 100 to determine the life cycle of the objects.

The bulk declare integration 194 gathers information about objects in the data sources 150, 152, and 154. When an object is identified as a record, the object is bulk declared and moved into the records management system 134, including filing into a file plan 136. The relational archiver service 192 performs a similar function for non-record objects that are in the structured data source. The compliance system 100 manages the retention and disposition of objects. The compliance system 100 decides when objects should be destroyed, when they should be placed on legal hold, and how long they should be retained.

Objects in the databases that match compliance criteria are copied from the database into the archive of objects 180 and associated with centralized policy system 170 storing one or more policies. The archive of objects 180 may also be described as a relational archiver collection.

Embodiments advantageously provide unified compliance over structured (e.g., database tables) and unstructured objects (e.g., documents, images, etc.).

Structured objects are objects that live as rows over different relations in a database subject to application knowledge about what constitutes a record. For example, a join of a number of relations in the database constitutes a record instance, expressible in Structured Query Language (SQL) with an end game relation representation of the projection of the SQL.

Embodiments treat structured objects (i.e., structured data) as a unit of unstructured data called an archive dataset stored in the archive of objects 180. The archive dataset may also be referred to as an "archive", a "dataset" or a collection of objects". Thus, with embodiments, the archive of objects 180 stores the archive datasets, while the common object store 132 stores the tracking object used to enforce compliance. This advantageously unifies management so that the unit of records management is normalized to be an unstructured unit universally for both structured and unstructured objects.

With embodiments, an archive dataset may include many objects. A hold (action to prevent an object from being deleted) may be associated with the archive dataset. The hold may be described as a metadata object that has references to archive datasets that need to be put on hold. A release may be described as an action that can be a full release of a hold or a partial release of a hold. The metadata object stored in the common object store 132.

Embodiments convert structured records into an archive dataset stored in the archive of objects 180 (e.g., a database backup or American Standard Code for Information Interchange (ASCII) unload of rows in a database) that has the capability of a split/merge operation on an arbitrary archive dataset via query and concatenate mechanisms. The split/merge operation permits optimal management tradeoff in the number of archive datasets needed. For the most part, the archive datasets aren't disturbed unless there is a discovery event or a lifecycle event that requires a split or a merge as the case may be. Embodiments merge like archive datasets and split archive datasets minimally to meet the lifecycle or discovery goals.

Management is logically handled with file plan containers (e.g., folders) in the file plan 136 that store information about the archive datasets capturing the life cycle policy, time, and schedules.

Embodiments solve a number of issues in order to properly manage structured objects as records. These include:
  how to manage the lifecycle of the structured objects that represents objects subject to compliance;
  how to integrate that management of structured information into a typical compliance (records) management file plan, such that the file plan will drive the management of the structured objects; and
  how to manage the large scale of information represented by structured objects, which may be orders of magnitude larger than a typical compliance solution.

Embodiments manage structured content as subject to compliance. Embodiments combine a number of processes to perform such management, including:

1. For objects subject to compliance, a tracking object is created that represents the structured archive dataset. The retention and destruction for objects subject to compliance are specified by a corporate retention plan. The tracking object may be stored in the common object store 132.

2. For objects subject to records management, in the file plan 136, record series (nodes in the file plan to which similar records are assigned) are created to manage structured records. Multiple of these record series may be created to represent different types of structured records.

3. The record series define the disposition schedules for the structured records.

4. Previously created object definitions are associated with the record series.

5. The objects that match the compliance criteria are copied from the database into an archive dataset. The extraction process runs on a recurring basis based on the type of object and the disposition trigger information for the object. In this way, the archive data sets may be grouped based on the disposition trigger, such that any one archive dataset may hold a single type of object with a similar disposition trigger value.

6. These archive datasets may be locked down to insure that they are retained and only disposed of by the compliance process under the appropriate disposition schedule.

7. Each archive dataset may be represented for compliance as a single object in the retention plan. For records, the object is filed in the record series and is represented by a single record associated with the record series that contains the disposition trigger information for the archive dataset or similar archive datasets.

8. Normal disposition processing occurs on these objects. When the trigger criteria meets the disposition criteria, then the objects subject to compliance begins the disposition review process and, once disposition is approved, the archive dataset is destroyed.

With embodiments, the nature of the compliance life cycle management lends itself to manage structured objects as an aggregation, instead of individually. This is enabled by metadata associated at the aggregation level sufficient to manage the compliance lifecycle and policy. With embodiments, the structured file plan containers may be individually queried, split, and merged under the control of the compliance system.

By grouping the archive datasets based on their disposition triggers and their disposition trigger values, embodiments insure that objects in an archive dataset are eligible for disposition at the same time. This allows the disposition process to be performed on the archive dataset rather than on the individual objects. By aggregating the objects, the compliance system manages a large number of objects with a reasonable amount of processing that would not be achieved if the objects were managed individually.

Embodiments manage disposition triggers that are based not only on the creation of the objects, but also based on other criteria, such as an event associated with the object. An example of this is a trigger that says all objects associated with a contract are to be disposed of five years after the contract is closed. Again, this is managed by grouping these objects into archive datasets that are based on the type of object (which defines the disposition trigger field) and the value of the disposition trigger.

Embodiments manage holds on matching objects. Since not all objects in archive dataset will necessarily meet the hold criteria, a new archive dataset may be created based on a hold request to group the objects into a new hold archive dataset that will then be retained until the hold is removed.

With embodiments, managing structured content as individual compliance objects through the processing of managing objects as individual objects is impractical at scale. The number of structured objects will overwhelm a compliance system. Further, the disposition review process may become untenable as millions or even tens of millions of objects become ready for disposition at the same time.

With embodiments, managing the objects through archiving type mechanisms is also insufficient. Although using archive datasets to extract the objects and manage them as a group does provide efficiencies of scale, it does not provide true compliance or records management of the objects based on the typical event based disposition processing.

Embodiments manage the objects as meta objects, but at the same time process them based on a compliance management process that utilizes event based disposition schedules defined in a file plan, and compliance management disposition processes including full auditing and reporting including disposition reports.

Embodiments manage the structured content as compliance objects when scaling to very large numbers of objects.

For compliance objects, the scheduled is specified by the compliance system and process based on the type of objects being processed. With embodiments, a file plan (also called a classification scheme) is the core of a records management system 134. A file plan may be described as a tree like structure of file plan containers into which records are filed into the leaf nodes. A disposition schedule (also called a compliance schedule) is associated with a file plan container in the file plan, and this disposition schedule then applies to all records in that file plan container. Unlike a records management system 134, a database stores data in rows of a table, rather than as records in file plan containers of a file plan 136. Different file plan containers may be associated with different disposition schedules. For file plan containers in a hierarchy of file plan containers, a file plan container may inherit a disposition schedule of an ancestor file plan container.

The act of classification (i.e., filing records into the leaf file plan containers of a file plan) determines the type of record and the disposition schedules that will be applied to that record. A typical disposition schedule may be based on a date property of the records and may apply a retention period based on that date property. For example, the disposition schedule may be based on ContractClosed date metadata associated with a record plus a retention period of five years. In that scenario, the records are retained until five years after the date specified in the ContractClosed metadata for each record, and then the records are deleted. Each record is evaluated individually based on the metadata field associated with that record.

For structured objects, embodiments may utilize the same file plan container associated with a disposition schedule based on disposition dates of the structured objects. Compliance objects are created in the compliance system while records are created in file plan containers in the file plan that represent the structured content that is being managed. However, due to the large volume typically associated with structured content, embodiments associate a group of structured objects (e.g., a group of rows of a table) with a single compliance object (e.g., a single record in a file plan container). These objects are grouped based on the effective disposition date of the objects so that they may be treated as one archive dataset instead of individually.

Embodiments support the volume of objects with the creation of archive datasets to be treated as a single object. Processing the objects on a singular basis may lead to performance issues, even with the fastest compliance system. At the same time, it is necessary for an object to be dispositioned based on the individual trigger for that object.

Embodiments define a type of object. This object definition describes the database information that is included in the object. With embodiments, the object may be spread across multiple tables with specific rows from these table being included based on the rules specified on extracting the object.

Embodiments next determine which file plan container associated with a disposition schedule these objects are to be associated with. Typically, all of the objects in a single object definition may be associated with a single file plan container associated with a disposition schedule. For instance, if the object represented a "Trade", then all trades may be associated with a single file plan container. Since the objects are associated with the same file plan container, they will have a common disposition schedule.

In some cases, objects of a single object definition may be associated with different locations in the file plan dependent on some additional metadata on the objects. For instance, objects associated with the state of Florida may have a different disposition schedule than objects associated with California. In that case, the Florida objects would be associated with one file plan location while those from California, even though they are of the same object type, would be associated with a different file plan location.

In an application, there may likely be several or many different types of objects. Examples for a simple application that stores trade information may include Trades, Customers, Accounts, and objects of the trades, such as stocks. Each of these types of objects has its own object definition that will extract from the database all of the information necessary to represent that object.

Once a type of object has been defined and associated with a file plan container associated with a disposition schedule, embodiments extract the objects of that type and create a compliance object to represent the objects. The simplest way to do this may be to extract individual objects and create an object for each one, but this simple solution would not scale in a typical application that may have millions or even billions of objects.

Instead, embodiments rely on the fact that objects of a particular type utilize the same disposition trigger metadata. Instead of extracting single objects, embodiments extract all objects of a type that have a disposition date within a particular range. The process to identify the objects to extract as retention objects will then be run on a recurring basis to pick up new objects that are ready for assigning a disposition schedule or declaring as a record based on their disposition trigger.

With reference to the example using the system of trades, embodiments start by defining the Trade object. This definition defines all of the rows that are to be extracted to fully represent a Trade. This object is then associated with a file plan container, where the disposition schedule is defined as trade date plus five years, where the trade date is the date when the Trade is added to the database. This means that a Trade object is retained for five years from the date it is created and is destroyed after those five years.

With the definitions above, embodiments run periodically (e.g., on a daily basis) to identify Trade objects that should be declared as compliance objects. In particular, embodiments look for Trade objects in the database that were created since the last time the sweep was run. These Trade objects are then extracted and stored in a file called a retention archive dataset. This retention archive dataset is retained and is only deleted by the compliance disposition processes We then create a compliance object in the compliance system or file plan container that represents Trades and specifies the five year retention for these objects. This object has a link to the retention archive dataset that was already created. The trigger property, called DateOfTrade, is populated with the date on which the trades occurred.

This retention object is then managed like any other object subject to compliance such as a physical or electronic record. After five years, the compliance system disposition process identifies this object as ready for disposition. At that time, the disposition process performs any reviews that are defined in the disposition process. After the reviews have been completed, then the retention archive dataset is marked as ready for destruction. In this case, the object is representing the retention archive dataset, so when the object is destroyed, the retention archive dataset that it represents is destroyed along with the object.

A hold identifies objects that should not be deleted even though they are ready for disposition based on their associated disposition schedule. A hold typically identifies objects that must be retained due to some activity, such as a legal action or an audit. Until this activity has been completed, any objects associated with the activity must be retained, even if their disposition schedules indicates they are ready for disposition.

A hold is created for each specific activity, and the objects that are related to that activity are then associated with the hold. For instance, if there is a dispute about the trades in an account, then any and all objects associated with that account are placed on hold. The objects remain on hold until the dispute has been resolved, at which time the hold is terminated. Once the hold is terminated, the objects associated with the hold are dispositioned based on their associated disposition schedules. If objects are already ready for disposition when the hold is terminated, then those objects would immediately start the disposition process including any review process defined for that type of object.

Since embodiments group objects based on the object type and the target disposition, care is taken to insure that the correct objects are placed on hold. With each object subject to compliance in the compliance system representing a large number of objects, it is not proper to place the whole archive dataset on hold. That may lead to objects unrelated to the hold not being disposed of based on their applicable disposition schedule.

Instead, embodiments create a new archive dataset or pointers to objects that are related to the hold. These objects would be copied from the retention archive dataset into a new archive dataset associated with the hold (a hold archive dataset). When the hold is resolved, then this new archive dataset may be destroyed, but as long as the hold is active, the archive dataset is retained to insure the applicable objects are retained.

While holds are in progress, the normal disposition process continues and destroys the regular archive dataset, even if some of the objects in that archive dataset are on hold. This is possible since those objects that are on hold are copied into the hold archive dataset.

Figure 2:
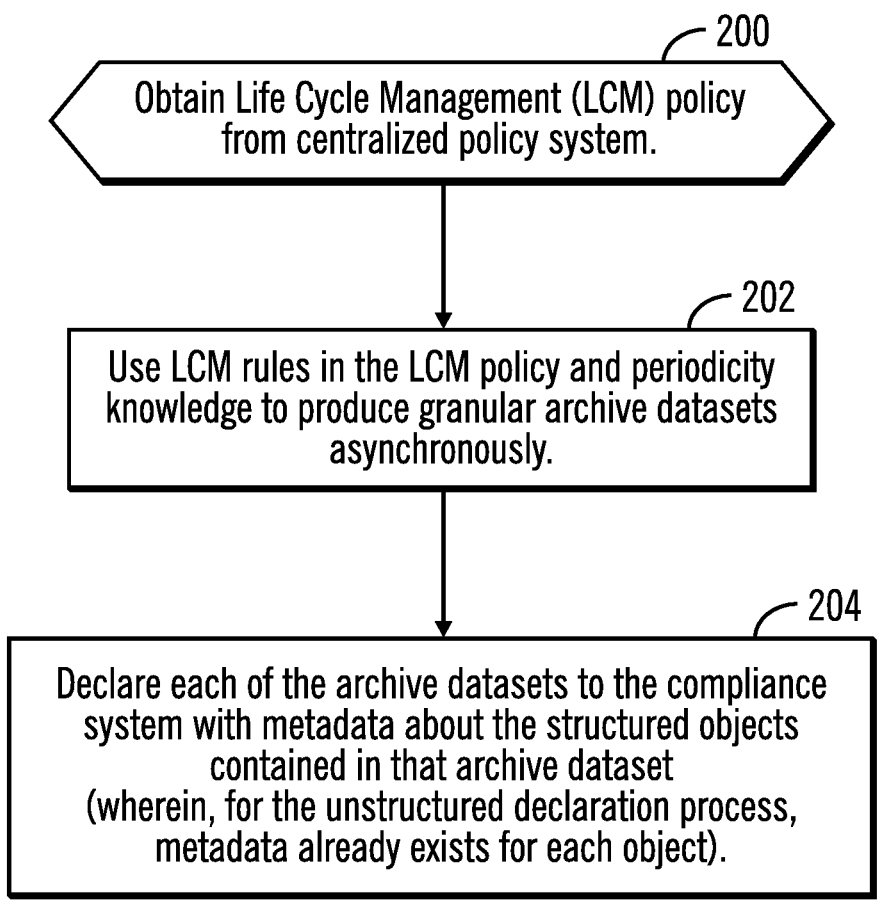
FIG. 2 illustrates, in a flow chart, operations for a declare phase and a general archiving process based on a life cycle management policy driven in a relational archiver service in accordance with certain embodiments.

FIG. 2 illustrates, in a flow chart, operations for a declare phase and a general archiving process based on a life cycle management (LCM) policy driven in a relational archiver service 192 in accordance with certain embodiments. Control begins at block 200 with the relational archiver service 192 obtaining a Life Cycle Management (LCM) policy from a centralized policy system 170. In block 202, the relational archiver service 192 uses LCM rules in the LCM policy and periodicity knowledge to produce granular archive datasets asynchronously. In block 204, the relational archiver service 192 declares each of the archive datasets to the compliance system 100 with metadata about the structured objects contained in that archive dataset (wherein, for the unstructured declaration process, metadata already exists for each object).

With embodiments, for structured data sources, the relational archiver service 192 obtains a life cycle policy from a centralized policy system 170. The relational archiver service 192 uses LCM rules and periodicity knowledge. When creating archive datasets, it is desirable to have them cover a certain time period that meets the customer's needs. Factors would include the targeted size of the archive dataset, and the granularity that the customer seeks. If the customer wants objects to start disposition within a day of the target data, then the periodicity would need to be a day or less. If they can support less granularity, then it could be a week or even longer—also factoring in how large of an archive dataset the customer wants—with longer periods between extractions causing large archive datasets. to produce granular archive datasets asynchronously. Every archive dataset is declared to the compliance system with metadata about the structured object contained. Each archive dataset may contain a multiplicity of compliance objects that have relational integrity. Also, each archive dataset may be denormalized and/or cannonicalized to JavaScript® Object Notation (JSON) or eXtensible Markup Language (XML) in some cases. (JavaScript is a registered trademark of Oracle Corporation in the United States and/or other countries.) The archiving system is capable of querying, splitting, and merging/copying, as a whole, archive datasets.

Some embodiments construct archive datasets by application silo and with coarse date ranges where the semantics of the data within the archive dataset is well understood from the metadata. In other instances, the metadata may be self-explanatory.

For unstructured data sources, the repositories do the archiving.

All Create, Read, Update, and Delete (CRUD) events on objects are declared to the compliance system that catalogs each unstructured object individually.

Figure 3:
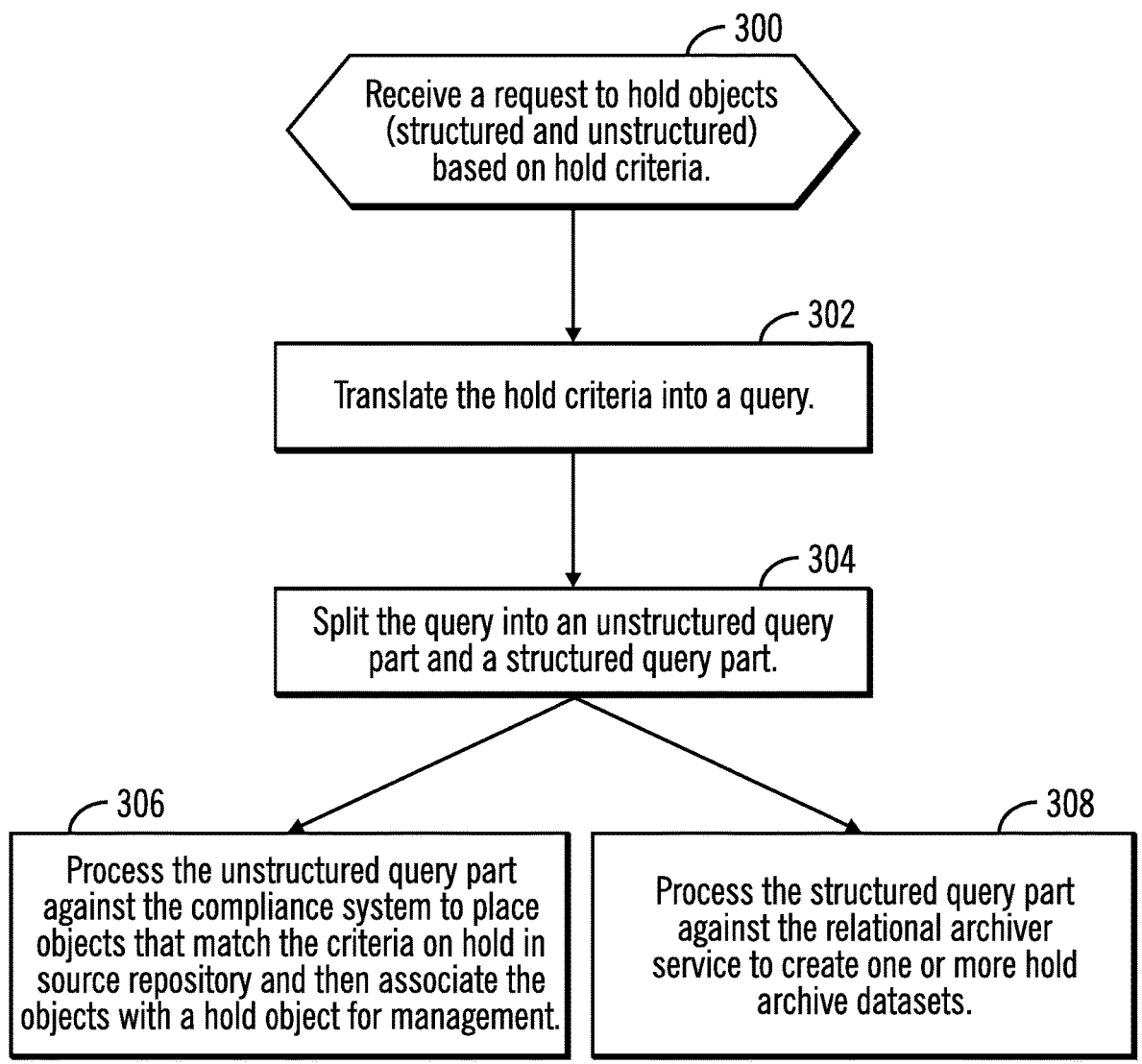
FIG. 3 illustrates, in a flow chart, operations for discovery action in accordance with certain embodiments.

FIG. 3 illustrates, in a flow chart, operations for discovery action in accordance with certain embodiments. Control begins at block 300 with the compliance service and disposition engine 110 receiving a request to hold objects (structured and unstructured) based on hold criteria. In block 302, the compliance service and disposition engine 110 translates the hold criteria into a query. In block 304, the compliance service and disposition engine 110 splits the query into an unstructured query part (for which processing continues to block 306) and a structured query part (for which processing continues to block 308). In block 306, the compliance service and disposition engine 110 executes the unstructured query part against the compliance system 100 to place objects that match the criteria on hold in an unstructured data source (a source repository) and then associate the objects with a hold object for management. The hold object may be stored in the common object store 132. In block 308, the compliance service and disposition engine 110 executes the structured query part against the relational archiver service 192 to create one or more hold archive datasets.

There are two approaches: a split copy approach and a hard split approach. In the split copy approach, embodiments do not physically split the original archive dataset to create the hold archive dataset. Instead, these embodiments copy qualifying objects from the original archive dataset to the hold archive dataset. With such a copy, the qualifying objects also remain in the original archive dataset. The split copy approach may have storage overhead, but at higher speed of execution.

In the hard split approach, embodiments physically split the original archive dataset by moving qualifying objects from the original archive dataset to the hold archive dataset. With such a move, the qualifying objects do not remain in the original archive dataset. With such a move, for a release operation of objects, merges may be used. The hard split approach may have slower performance, but better storage utilization as a tradeoff.

With embodiments, the process of legal electronic discovery (e.g., ediscovery) may involve other operations prior to a hold that may be exploratory in nature (e.g., as in early case assessment flows), but essentially it may be considered to be the same as the hold process without actually affecting the hold, but simply running the query and obtaining results that are not acted upon in instantiating the actual hold action.

With embodiments, a hold may be defined in legal terms as putting a subset of objects and owners of those objects in a workflow that does not allow those objects to be deleted or modified in any way from the perspective of the system implementing the hold action, until there is a release of that hold.

With embodiments, a hold criteria is presented to the unified corpus of data (structured and unstructured) to identify particular objects.

The hold criteria is translated into a query. Then, the query is split into an unstructured query part and a structured query part. The unstructured query part goes to the unstructured metadata corpus in the compliance system. The structured query part goes to the relational archiver service 192 and may be rewritten as a structured query (an embodiment of which may be SQL) by inspection of the relational archiver service 192 archive dataset metadata that involves selecting a set of relevant archive datasets that may be affected by this hold order.

The query part that goes to the structured metadata results in running a query and creating one or more split hold archive datasets from the original data of potentially affected archive datasets that were identified using the archive dataset metadata and the hold criteria.

The split may be a split copy (copy of objects in the original archive dataset) or a hard split (physical split of objects from the original archive dataset).

For example, for original affected archive datasets {D1, D2, etc.}, for a split copy, D1 remains as D1 and also produces a subset of D1 as D1hold. So D1hold is a subset of objects of D1 or D1hold's set of objects is included in D1.

For example, for original affected archive datasets {D1, D2, etc.}, for a hard split, this causes D1 to D1prime+ D1hold, and so on with D2, etc. Note that D1prime and D1hold are disjoint sets of objects Corresponding metadata in the compliance system 100 is created to reflect this in the pseudo folders for the structured objects.

Figure 4:
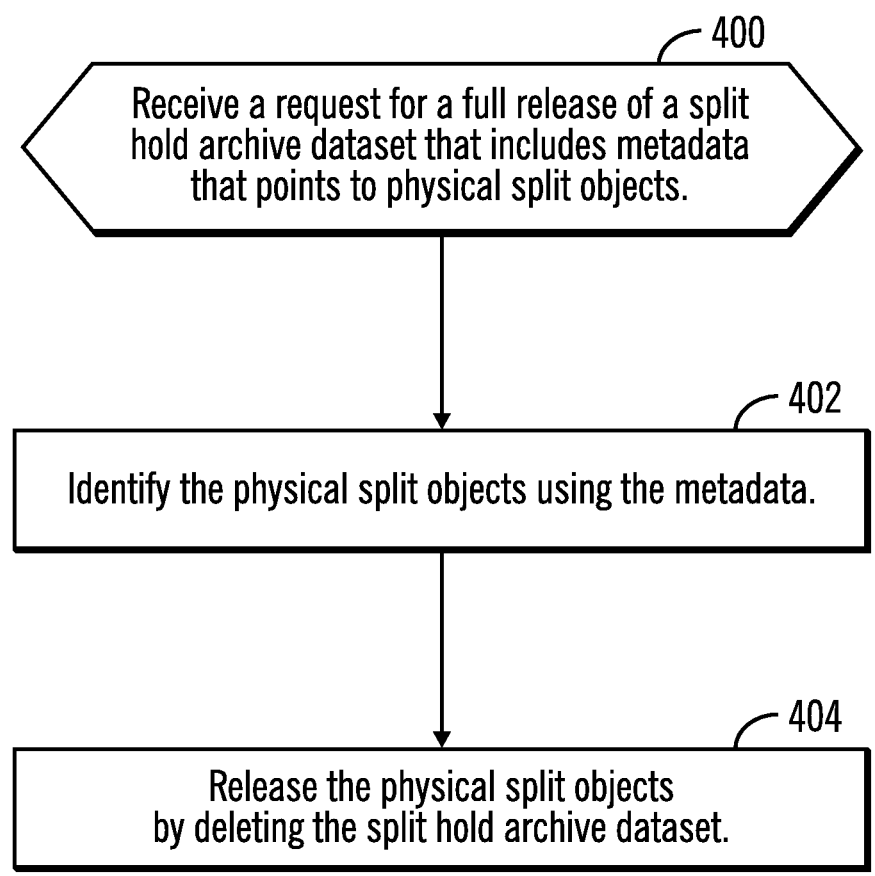
FIG. 4 illustrates, in a flow chart, operations for a release of a hold archive dataset created with a split copy operation in accordance with certain embodiments.

FIG. 4 illustrates, in a flow chart, operations for a release of a hold archive dataset created with a split copy operation in accordance with certain embodiments. This processing is for the structured case that uses archive datasets. Control begins at block 400 with the compliance service and disposition engine 110 receiving a request for a full release of a split hold archive dataset that includes metadata that points to physical split objects. In block 402, the compliance service and disposition engine 110 identifies the physical split objects using the metadata. In block 404, the compliance service and disposition engine 110 releases the physical split objects by deleting the split hold archive dataset.

Figure 5:
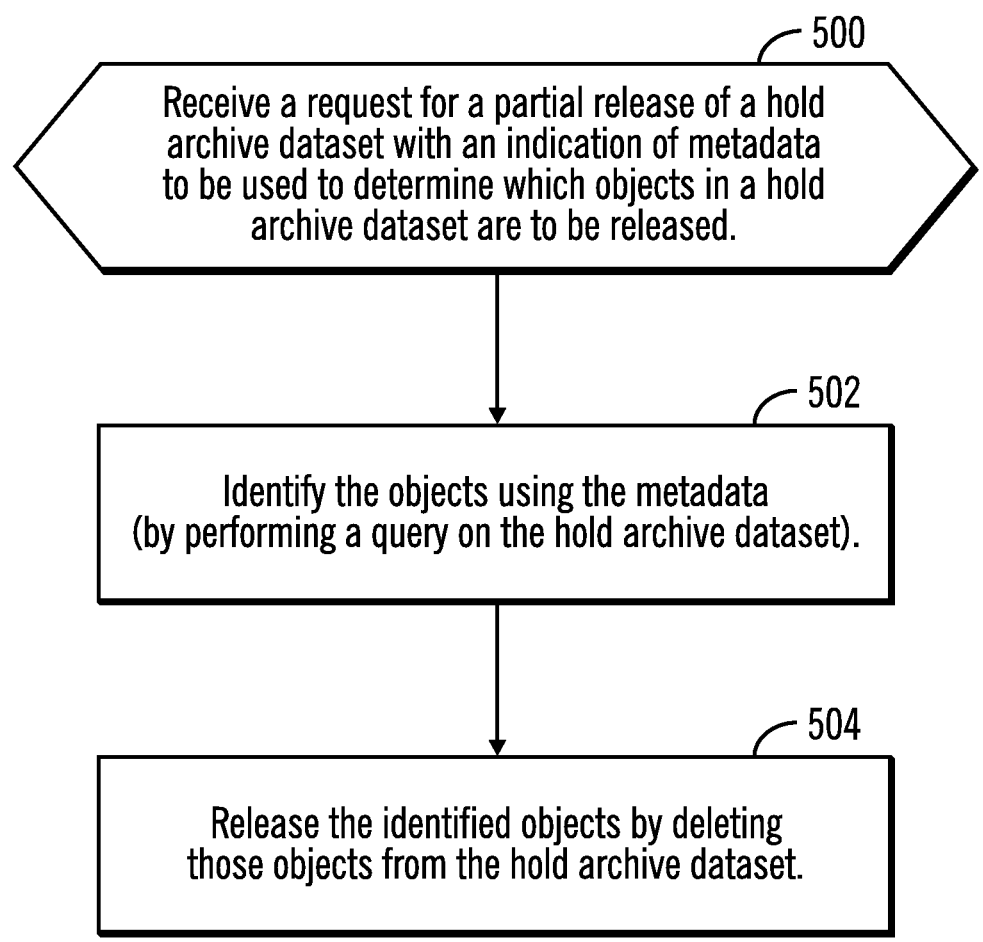
FIG. 5 illustrates, in a flow chart, operations for a release of a hold archive dataset created with a hard split operation in accordance with certain embodiments.

FIG. 5 illustrates, in a flow chart, operations for a release of a hold archive dataset created with a hard split operation in accordance with certain embodiments. Control begins at block 500 with the compliance service and disposition engine 110 receiving a request for a partial release of a hold archive dataset with an indication of metadata to be used to determine which objects in a hold archive dataset are to be released. In block 502, the compliance service and disposition engine 110 identifies the objects using the metadata (by performing a query on the actual hold archive dataset). In block 504, the compliance service and disposition engine 110 releases the identified objects by deleting those objects from the hold archive dataset.

Figure 6:
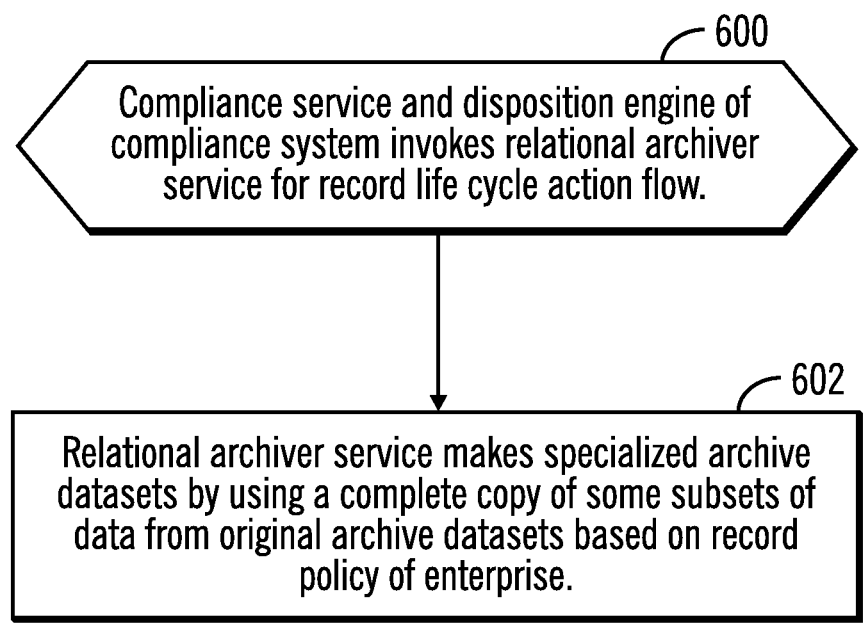
FIG. 6 illustrates, in a flow chart, operations for preservation in accordance with certain embodiments.

FIG. 6 illustrates, in a flow chart, operations for preservation in accordance with certain embodiments. Control begins at block 600 with the compliance service and disposition engine 110 of the compliance system 100 invoking the bulk declare integration 194 for record life cycle action flow. In block 602, the relational archiver service 192 makes specialized archive datasets by using a complete copy of some subsets of data from original archive datasets based on record policy of enterprise.

For the life cycle action flow, driven from the compliance system, that has compliance or record policy knowledge, the relational archiver service 192 is instructed to make specialized archive datasets using a complete copy of some subsets of data from the original archive datasets based on a policy of the enterprise.

Figure 7:
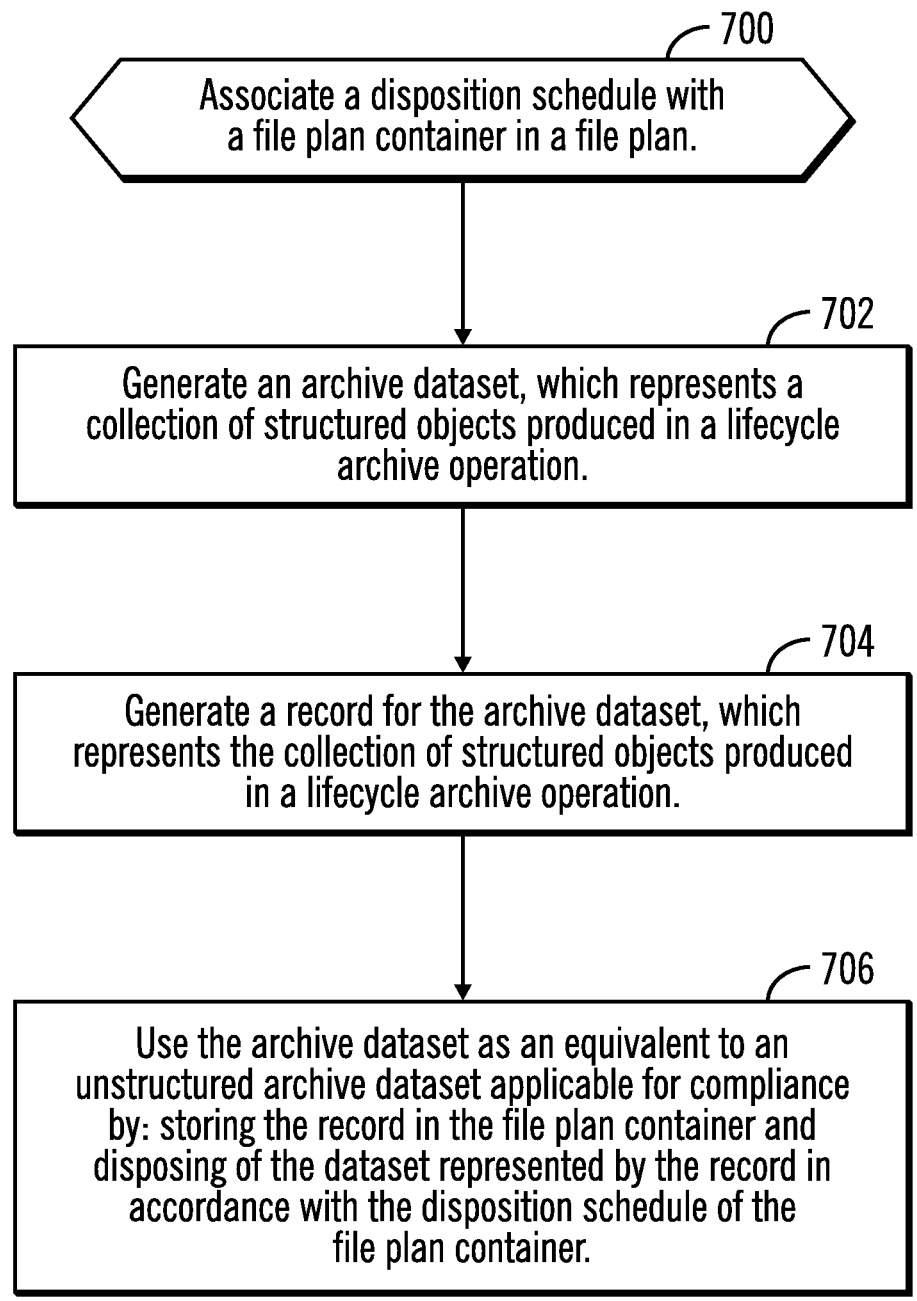
FIG. 7 illustrates in a flow chart, operations for treating unstructured objects and structured objects in unified form, within a compliance system, in accordance with certain embodiments.

FIG. 7 illustrates in a flow chart, operations for treating unstructured data and structured objects in unified form, within a compliance system, in accordance with certain embodiments. Control begins at block 700 with the compliance service and disposition engine 110 associating a disposition schedule with a file plan container in a file plan. In block 702, the compliance service and disposition engine 110 generates an archive dataset, which represents a collection of structured objects produced in a lifecycle archive operation In block 704, the compliance service and disposition engine 110 generates a record for the archive dataset, which represents the collection of structured objects produced in a lifecycle archive operation. In block 706, the compliance service and disposition engine 110 uses the archive dataset as an equivalent to an unstructured archive dataset applicable for compliance by: storing the record in the file plan container and disposing of the archive dataset represented by the record in accordance with the disposition schedule of the file plan container.

Embodiments not only provide full compliance management capabilities for structured objects, but also address the issues of scale when performing records management of structure data. Embodiments maintain the integrity of objects. In particular, a single object may span multiple rows in multiple tables to represent the full object. When deleting from the database, embodiments ensure that an object is retained or deleted in its entirety by retaining or deleting the multiple rows for that object.

With embodiments, there is support for a file plan container associated with a disposition schedule to manage the retention and disposition of the objects that is not pre-calculated and static, but may be modified if the associated node in the file plan is modified, such that the retention period is changed. Instead of managing individual rows in a database, embodiments work on the object level using pre-defined definitions to understand what comprises an object and managing all of the rows that comprise that object as a group to insure they are retained and deleted on the same disposition schedule so that the object either completely exists or is completely deleted.

Embodiments address the issue of scale when managing structured objects (e.g., which may include billions of objects) by grouping sets of objects that will be ready for disposition at the same time and extracts them as a group to be managed outside of the production system. When disposition occurs, the whole grouping may be deleted in a single operation, instead of deleting large numbers of database rows.

Embodiments also support placing holds on the structured objects, where holds are needed when some action has occurred (lawsuit, audit, etc.), that requires that the records be kept longer than their specified retention period. Doing this on large amounts of structured objects may overwhelm the records management system 134, but embodiments do this more efficiently.

Embodiments also handle updates of records in the database. The record may be handled by an immutable COPY2PRESERVE action in the archive dataset. The archive dataset elements represent the "content" of the record metadata in the records management system 134 (that it is a batch in the archive dataset where individual elements are queriable directly to the archive dataset). So the database may be updated etc., and that does not affect that the point in time snapshot of the object that is immutable till the record management lifecycle of the object is complete. That is, the copy made into the archive dataset is immutable and represents the object at a point in time.

Thus, embodiments treat unstructured data and structured objects in unified form, within a compliance system, by: associating a disposition schedule with a file plan container in a file plan; generating a record for a dataset, which represents a collection of the structured objects produced in a lifecycle archive operation; and using the dataset as an equivalent to an unstructured dataset applicable for compliance by: storing the record in the file plan container and disposing of the dataset represented by the record in accordance with the disposition schedule of the file plan container.

Moreover, with embodiments, the collection of the structured objects comprises structured objects having a disposition date within a particular range. With embodiments, the file plan container includes a record to represent an unstructured object, and the record representing the unstructured object is disposed in accordance with the disposition schedule. Also, with embodiments, the record representing the collection of the structured objects and the record representing the unstructured object are held based on a hold criteria. With embodiments, a hold archive dataset is created for the collection of the structured objects with one of a split copy operation and a hard split operation.

Figure 8:
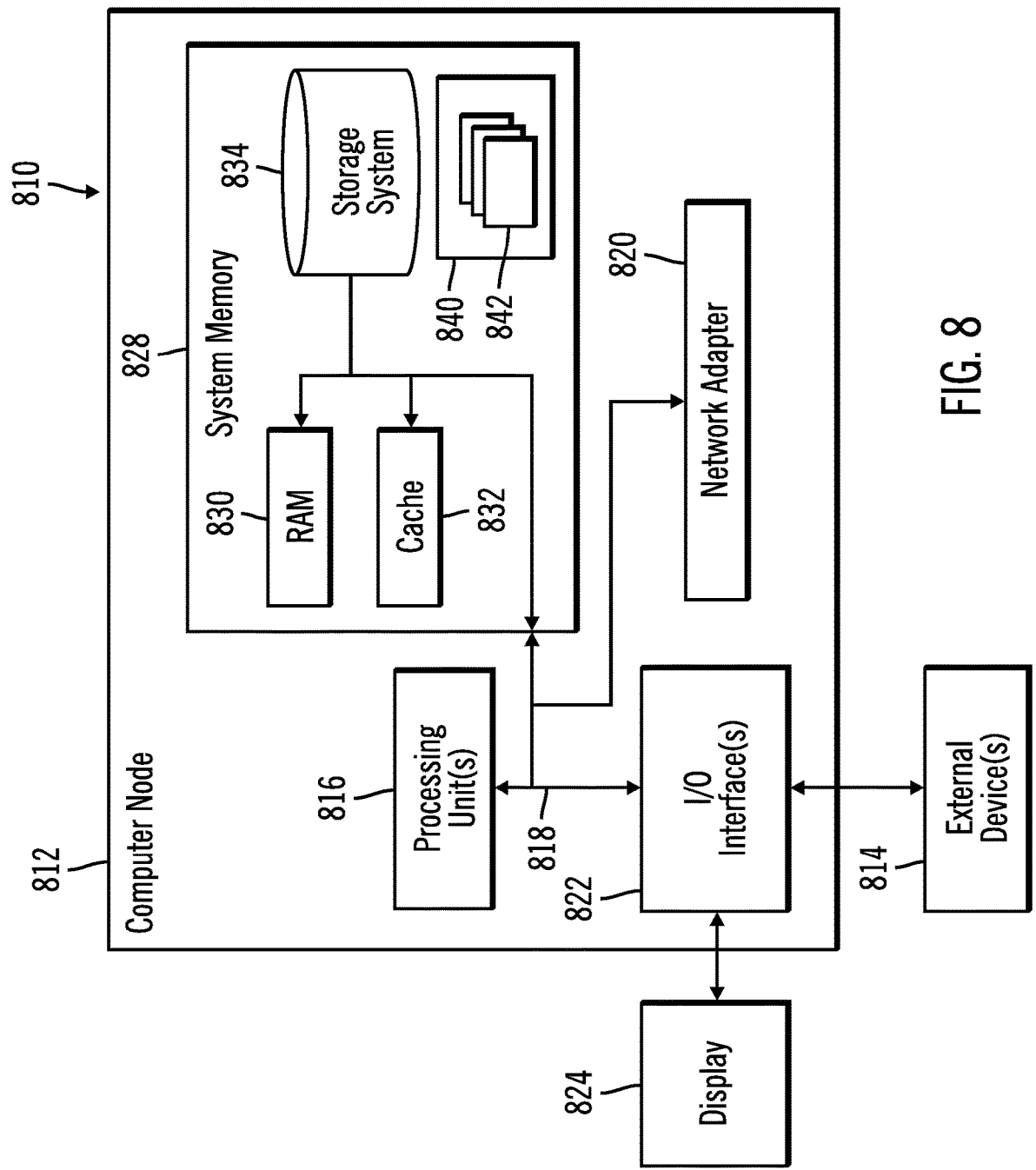
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 in cloud computing node 810 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the compliance system 100 has the architecture of computer node 812. In certain embodiments, the compliance system 100 is part of a cloud environment. In certain alternative embodiments, the compliance system 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
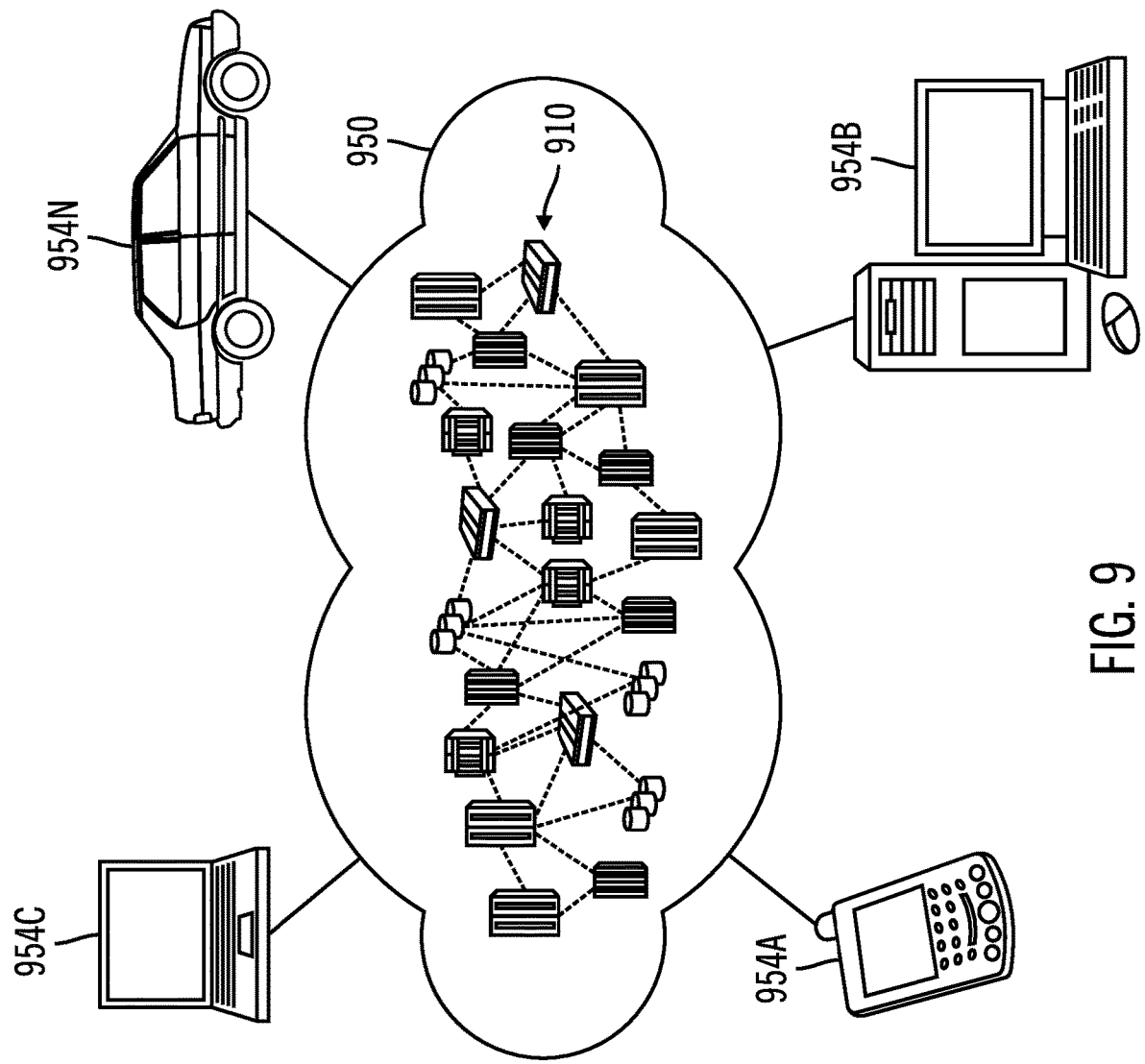
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
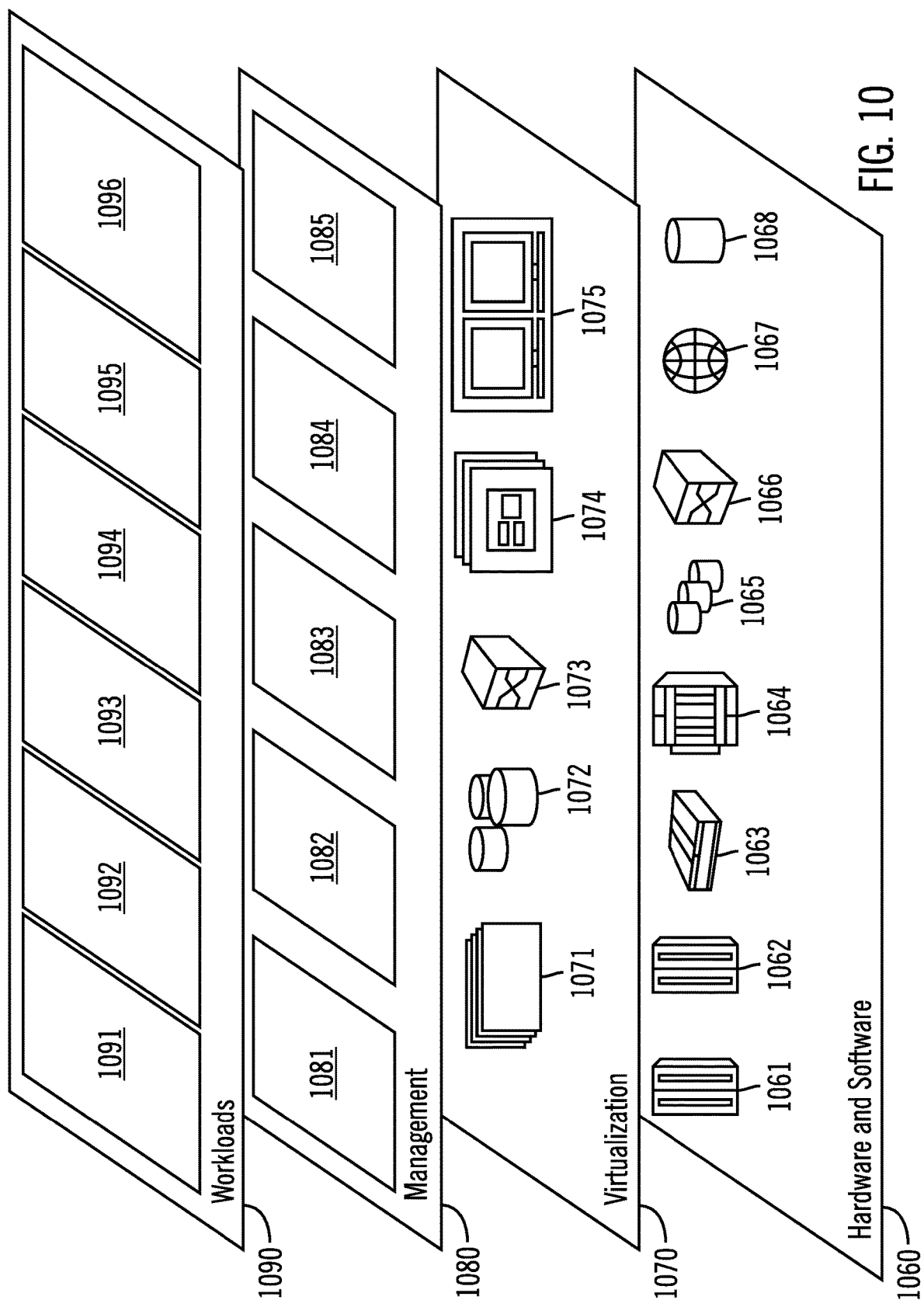
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and high performance compliance mechanism for structured and unstructured data in an enterprise 1096.

Thus, in certain embodiments, software or a program, implementing high performance compliance mechanism for structured and unstructured data in an enterprise in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    storing a collection of structured objects having a disposition date within a particular range as an archive dataset, wherein the structured objects comprise rows in a database;
    storing a record to represent the collection of the structured objects in a file plan container associated with the disposition date;
    in response to receiving a hold request for a subset of structured objects of the archive dataset, generating a hold archive dataset by copying the subset of structured objects from the archive dataset to the hold archive dataset, wherein the hold archive dataset is retaining the subset of structured objects until a release request for the hold archive dataset is received;
    in response to generating the hold archive dataset and in accordance with the disposition date associated with the file plan container, disposing of the archive dataset; and
    in response to receiving the release request for the hold archive dataset, deleting the hold archive dataset.

2. The computer-implemented method of claim 1, wherein the file plan container includes another record to represent an unstructured object.

3. The computer-implemented method of claim 2, wherein the unstructured object represented by the another record is disposed in accordance with the disposition date.

4. The computer-implemented method of claim 2, further comprising:
    holding the record representing the collection of the structured objects and the another record representing the unstructured object based on a hold criteria.

5. The computer-implemented method of claim 1, further comprising:
    creating the hold archive dataset with one of a split copy operation and a hard split operation.

6. The computer-implemented method of claim 1, wherein a Software as a Service (SaaS) is configured to perform the operations of the method.

7. A computer program product, the computer program product comprising a computer readable storage medium having program code embodied therewith, the program code executable by at least one processor to perform operations for:
    storing a collection of structured objects having a disposition date within a particular range as an archive dataset, wherein the structured objects comprise rows in a database;
    storing a record to represent the collection of the structured objects in a file plan container associated with the disposition date;
    in response to receiving a hold request for a subset of structured objects of the archive dataset, generating a hold archive dataset by copying the subset of structured objects from the archive dataset to the hold archive dataset, wherein the hold archive dataset is retaining the subset of structured objects until a release request for the hold archive dataset is received;
    in response to generating the hold archive dataset and in accordance with the disposition date associated with the file plan container, disposing of the archive dataset; and
    in response to receiving the release request for the hold archive dataset, deleting the hold archive dataset.

8. The computer program product of claim 7, wherein the file plan container includes another record to represent an unstructured object.

9. The computer program product of claim 8, wherein the unstructured object represented by the another record is disposed in accordance with the disposition date.

10. The computer program product of claim 8, wherein the program code is executable by the at least one processor to perform further operations for:
    holding the record representing the collection of the structured objects and the record representing the unstructured object based on a hold criteria.

11. The computer program product of claim 7, wherein the program code is executable by the at least one processor to perform further operations for:
    creating the hold archive dataset with one of a split copy operation and a hard split operation.

12. The computer program product of claim 7, wherein a Software as a Service (SaaS) is configured to perform the operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
storing a collection of structured objects having a disposition date within a particular range as an archive dataset, wherein the structured objects comprise rows in a database;
storing a record to represent the collection of the structured objects in a file plan container associated with the disposition date;
in response to receiving a hold request for a subset of structured objects of the archive dataset, generating a hold archive dataset by copying the subset of structured objects from the archive dataset to the hold archive dataset, wherein the hold archive dataset is retaining the subset of structured objects until a release request for the hold archive dataset is received;
in response to generating the hold archive dataset and in accordance with the disposition date associated with the file plan container, disposing of the archive dataset; and
in response to receiving the release request for the hold archive dataset, deleting the hold archive dataset.

14. The computer system of claim 13, wherein the file plan container includes another record to represent an unstructured object.

15. The computer system of claim 14, wherein the unstructured object represented by the another record is disposed in accordance with the disposition date.

16. The computer system of claim 14, wherein the operations further comprise:
holding the record representing the collection of the structured objects and the record representing the unstructured object based on a hold criteria.

17. The computer system of claim 13, wherein the operations further comprise:
creating the hold archive dataset with one of a split copy operation and a hard split operation.

18. The computer system of claim 13, wherein a Software as a Service (SaaS) is configured to perform the operations of the computer system.

* * * * *